United States Patent
Alwan et al.

(10) Patent No.: US 10,703,415 B2
(45) Date of Patent: Jul. 7, 2020

(54) VEHICLE FRAME ASSEMBLY

(71) Applicant: Ford Global Technologies, LLC, Dearborn, MI (US)

(72) Inventors: Jamil M. Alwan, Ann Arbor, MI (US); Chelliah Madasamy, Canton, MI (US); Matthew B. Makowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 73 days.

(21) Appl. No.: 16/003,398

(22) Filed: Jun. 8, 2018

(65) Prior Publication Data

US 2019/0375460 A1    Dec. 12, 2019

(51) Int. Cl.
*B62D 21/15*  (2006.01)
*B62D 25/08*  (2006.01)

(52) U.S. Cl.
CPC ......... *B62D 21/152* (2013.01); *B62D 25/082* (2013.01)

(58) Field of Classification Search
CPC ...... B62D 21/02; B62D 21/15; B62D 21/152; B62D 25/08
USPC ............ 296/187.03, 187.09, 187.1, 193.09
See application file for complete search history.

(56) References Cited

U.S. PATENT DOCUMENTS

| | | | |
|---|---|---|---|
| 3,856,324 A | 12/1974 | Saitoh | |
| 6,808,039 B2 * | 10/2004 | Roehringer | B62D 21/155 180/312 |
| 7,380,829 B2 * | 6/2008 | Kishima | B62D 21/155 180/232 |
| 7,393,016 B2 | 7/2008 | Mitsui et al. | |
| 9,868,467 B2 * | 1/2018 | Sasaki | B62D 21/152 |
| 2015/0151792 A1 * | 6/2015 | Mori | B62D 21/152 296/187.09 |
| 2015/0175208 A1 * | 6/2015 | Kuwayama | B62D 21/152 296/187.09 |
| 2016/0121934 A1 * | 5/2016 | Murayama | B62D 21/152 296/187.09 |
| 2019/0185061 A1 * | 6/2019 | Haga | B62D 25/082 |

FOREIGN PATENT DOCUMENTS

| | | |
|---|---|---|
| CN | 101837804 B | 1/2012 |
| JP | 2008222037 A | 9/2008 |
| JP | 201058586 A | 3/2010 |
| JP | 6037107 B2 | 11/2016 |
| KR | 1019960013516 B1 | 3/1999 |

* cited by examiner

*Primary Examiner* — Jason S Daniels
(74) *Attorney, Agent, or Firm* — Frank A. MacKenzie; Bejin Bieneman PLC

(57) ABSTRACT

A frame assembly includes a rail including a straight portion, the straight portion including a first portion, a second portion, and a deformation trigger between the first and second portions, and a bracket attached to the first portion and the second portion.

14 Claims, 8 Drawing Sheets

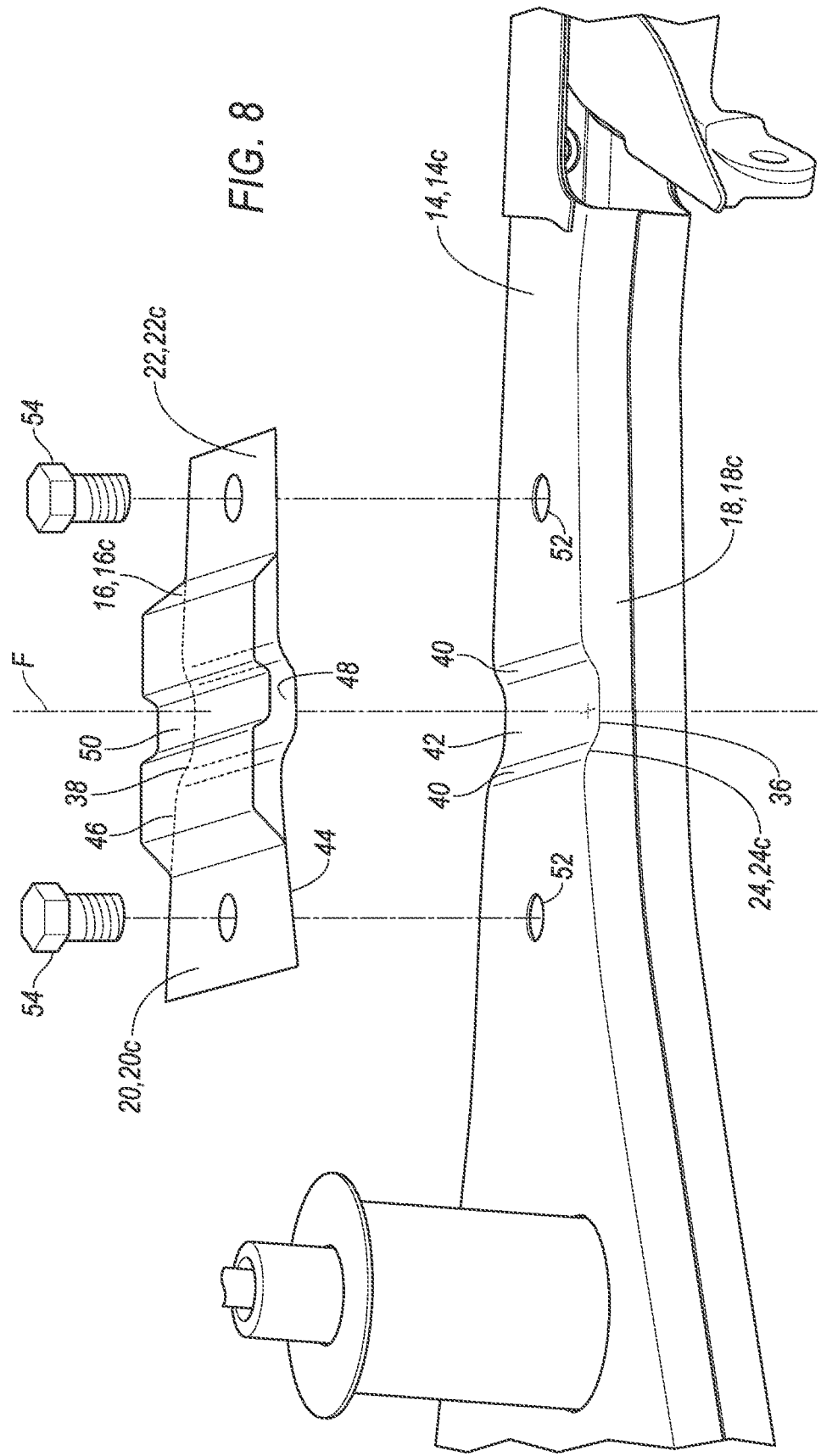

US 10,703,415 B2

VEHICLE FRAME ASSEMBLY

BACKGROUND

Several different vehicle models may be designed on a common platform. The platform has some common components, such as a common frame, that are shared by the different vehicle models, and the individual vehicle models may differ in other components, e.g., powertrain, exterior styling, interior trim levels, etc. The different components between the platforms may alter certain characteristics of the common components. For example, the deformation characteristics of a common frame during a vehicle impact may vary depending on different engine sizes used in different models.

BRIEF DESCRIPTION OF THE DRAWINGS

FIG. 8 is an exploded view of the rail with the divot and the third bracket.

DETAILED DESCRIPTION

Figure 1:
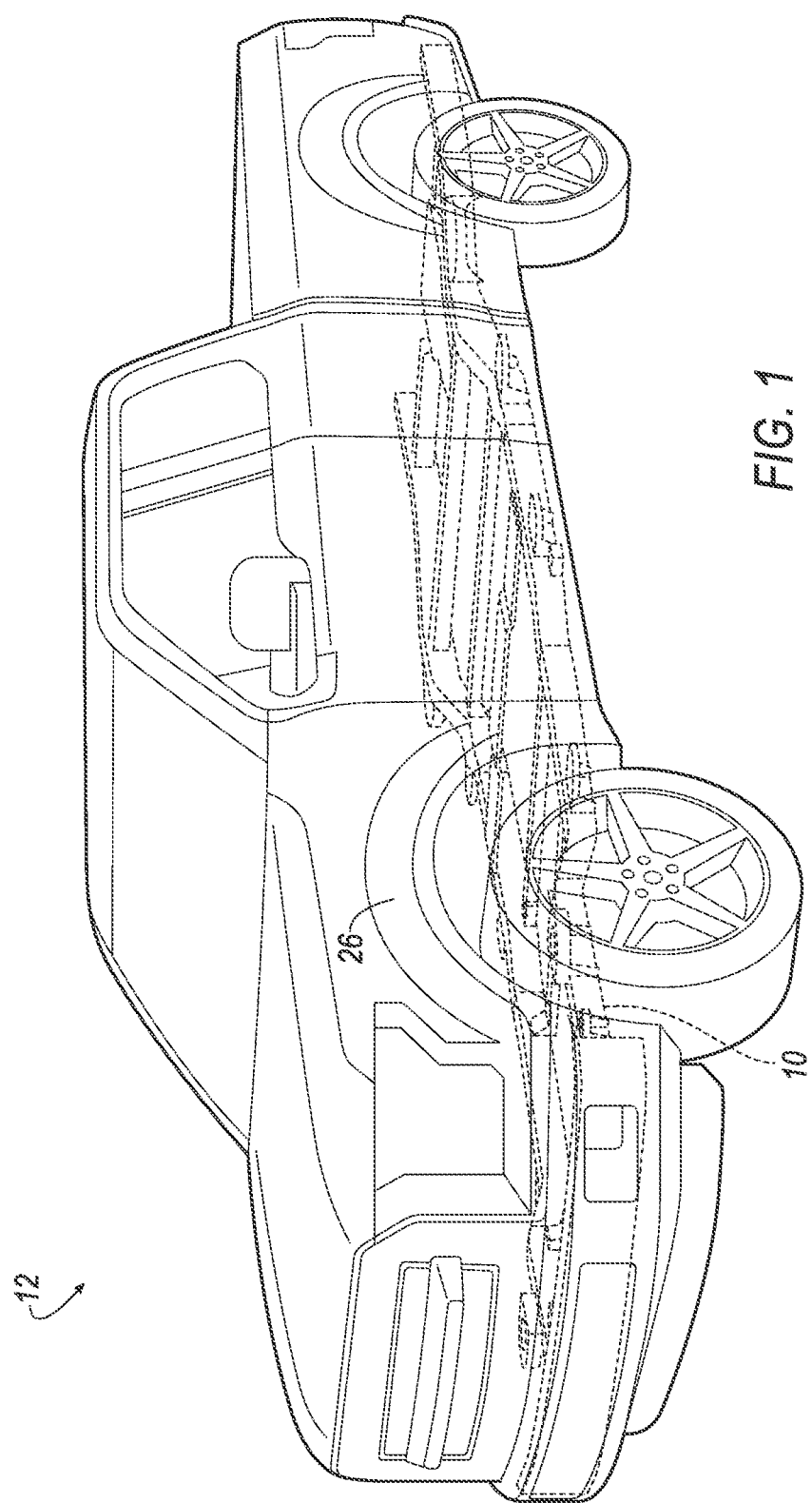
FIG. 1 is a perspective view of a vehicle with a frame assembly.

A frame assembly includes a rail including a straight portion, the straight portion including a first portion, a second portion, and a deformation trigger between the first and second portions, and a bracket attached to the first portion and the second portion.

The deformation trigger may be a divot. The bracket may include a protrusion that extends into the divot. The protrusion and the divot may have mating shapes. The bracket may include a first side facing the rail and a second side opposite the first side, the protrusion may extend from the first side, and the bracket may include a depression on the second side.

The bracket may include a depression aligned with the divot.

The deformation trigger may be deformable from an undeformed state to a deformed state and the bracket may be designed to deform when the deformation trigger is in the deformed state.

The bracket may include a slot disposed at the first portion and a fastener connecting the bracket to the rail in the slot. The slot may have a distal end and the deformation trigger may be deformable to a deformed state in which the fastener engages the distal end of the slot. The bracket may include a second slot at the second portion and a second fastener connecting the bracket to the rail in the second slot.

The deformation trigger may be a decrease in material thickness of the rail.

The bracket may be fixed to the rail on opposing sides of the deformation trigger.

A frame assembly includes a rail including a predetermined deformation trigger, and a bracket including a fastener and a slot, the fastener movable in the slot and connecting the bracket to the rail, wherein the bracket is attached to the rail on opposing sides of the deformation trigger.

The slot may have a distal end and the deformation trigger may be deformable to a deformed state in which the fastener engages the distal end of the slot.

The bracket may include a second slot disposed on an opposing side of the deformation trigger from the slot and a second fastener connecting the bracket to the rail in the second slot.

The deformation trigger may be a divot.

The deformation trigger may be a decrease in material thickness of the rail.

A frame assembly includes a rail including a straight portion and means for deforming the rail at a predetermined location on the straight portion, and a bracket attached to the straight portion.

The rail deforming means may include a divot.

The frame assembly may further include means for deforming the bracket after the rail deforming means deforms.

With reference to the Figures, wherein like numerals indicate like parts throughout the several views, a frame assembly 10 of a vehicle 12 includes a rail 14 and a bracket 16. The rail 14 includes a straight portion 18. The straight portion includes a first portion 20, a second portion 22, and a deformation trigger 24 between the first and second portions 20, 22. The bracket 16 is attached to the first portion 20 and the second portion 22.

During a vehicle impact, the bracket 16 deforms when the deformation trigger 24 deforms, allowing the rail 14 to absorb more energy during a vehicle impact while initiating deformation at the deformation trigger 24. The deformation trigger 24 may be at a predetermined location at which the rail 14 advantageously deforms. The bracket 16 allows installation of larger components, e.g., a battery and motor for an electric vehicle, onto the frame assembly 10 designed for components having a different weight and weight distribution, e.g., an internal combustion engine. Thus, a single frame assembly 10 can accommodate components of differing sizes and maintain similar impact deformation characteristics.

The vehicle 12 may include a body 26 and the frame assembly 10. As shown in FIG. 1, the body 26 and the frame assembly 10 may have a body-on-frame construction (also referred to as a cab-on-frame construction). In other words, the body 26 and the frame assembly 10 are separate components, i.e., are modular, and the body 26 is supported on and affixed to the frame assembly 10. As another example not shown in the Figures, the vehicle architecture may be a unibody construction, i.e., a unitary-body construction, in which the body 26 and the frame assembly 10 are unitary. The body 26 can be formed of any suitable material, e.g., steel, aluminum, etc.

Figure 2:
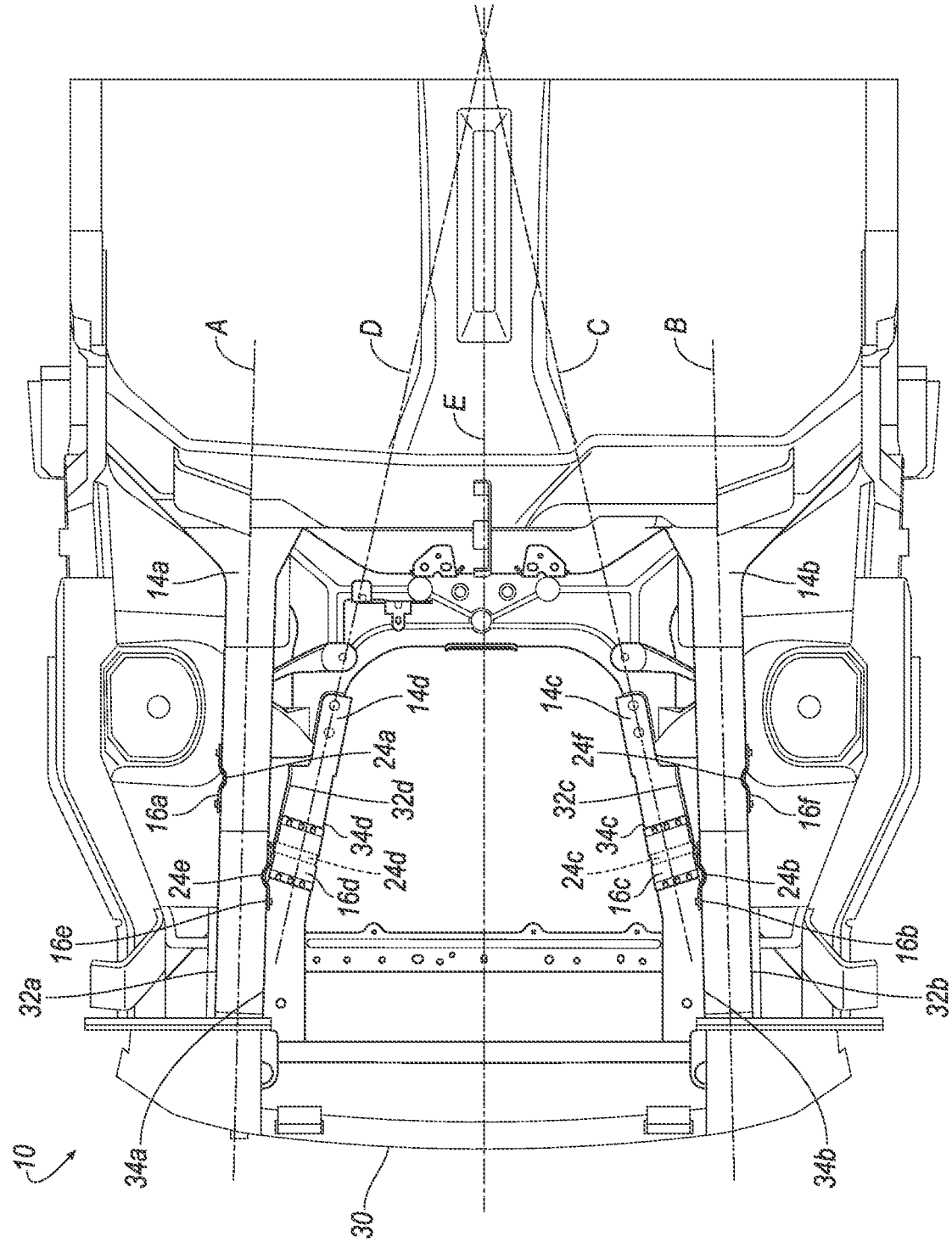
FIG. 2 is a plan view of a portion of the frame assembly.

The frame assembly 10 may include a plurality of rails 14, as shown in FIG. 2. The frame assembly 10 may include any suitable number of rails 14. For example, FIG. 2 shows four rails 14 distinguished from each other with an alphabetical identifier, in particular, a first rail 14a, a second rail 14b, a third rail 14c, and a fourth rail 14d, collectively, rails 14. The rail 14 may be a frame rail of a frame in a body-on-frame construction. Alternatively, the rail 14 may be a subframe rail of a subframe in a unibody construction.

During the vehicle impact, the rails 14 absorb impact energy and may deform. Each rail 14 includes at least one straight portion 18. Each straight portion 18 is a portion of the respective rail 14 that is elongated along a straight axis, e.g., one of the axes A, B, C, D shown in FIG. 2, e.g., the first rail 14a may extend along the axis A, the second rail 14b may extend along the axis B, the third rail 14c may extend along the axis C, and the fourth rail 14d may extend along the axis D. Alternatively, the rail 14 may have a plurality of portions, each portion elongated along a different axis. One or more portions of the rail 14 may curve, i.e., the portion may have a nonzero radius of curvature. The rail 14 may have a portion that curves to, e.g., address space constraints in the frame assembly 10, to connect to another rail 14, etc. The rail 14 may have a uniform cross section. Alternatively, the cross section of the rail 14 may change, e.g., the cross section of the rail 14 may change along the straight axis. For example, the cross section of the third rail 14c may decrease along the straight axis C. The cross section of the rail 14 may be chosen for specific deformation characteristics during the vehicle impact.

Each rail 14 may have an outboard side 32 and an inboard side 34. The first rail 14a has a first outboard side 32a and a first inboard side 34a, the second rail 14b has a second outboard side 32b and a second inboard side 34b, the third rail 14c has a third outboard side 32c and a third inboard side 34c, and the fourth rail 14d has a fourth inboard side 32d and a fourth inboard side 34d. The outboard side 32 of the rail 14 may face away from a center line E of the vehicle 12. The inboard side 34 may face toward the center line E of the vehicle 12. During the vehicle impact, the rail 14 may deform toward one of the outboard side 32 and the inboard side 34.

Figure 5:
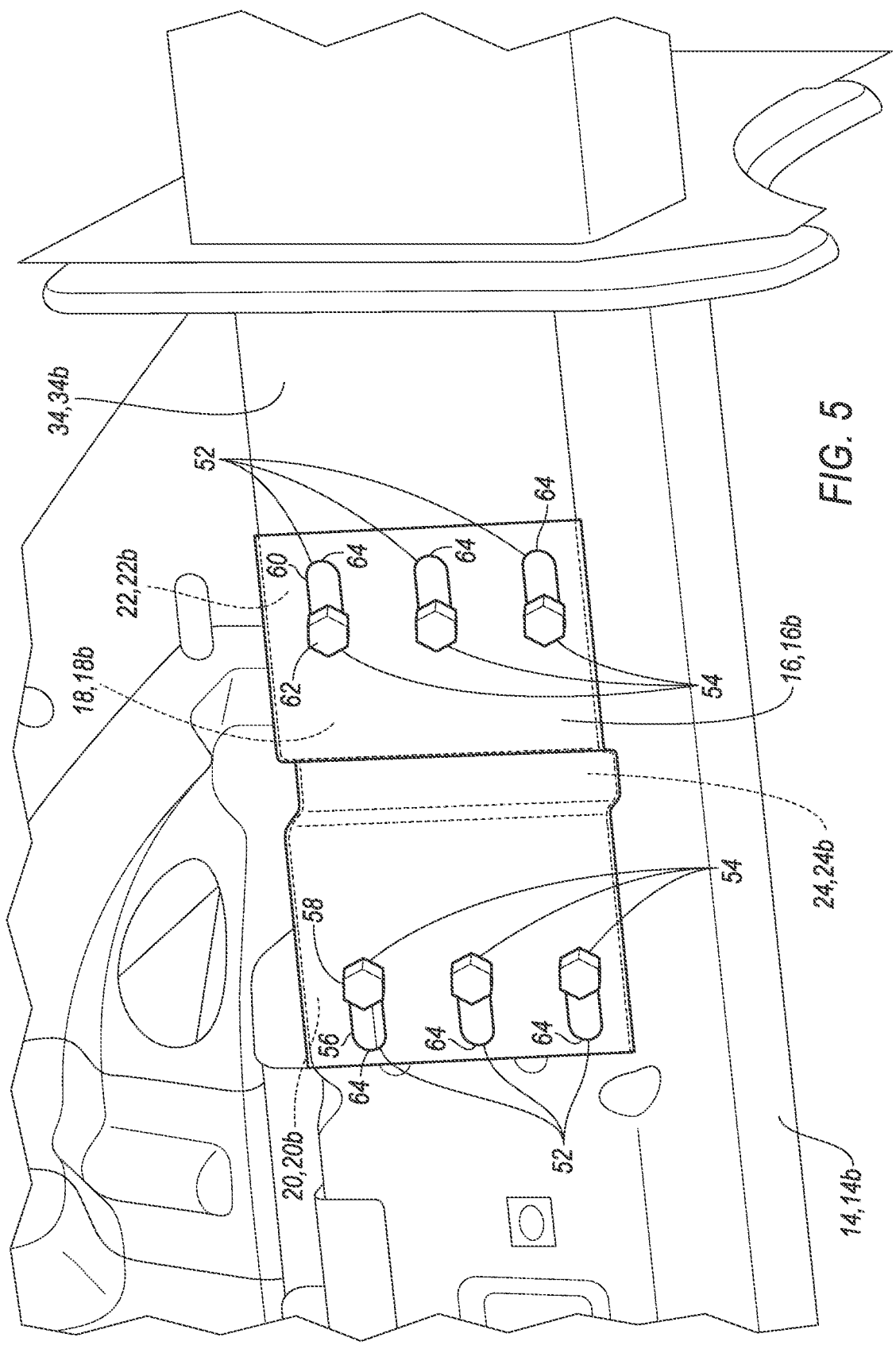
FIG. 5 is a magnified view of the second bracket of FIG. 4.
Figure 6:
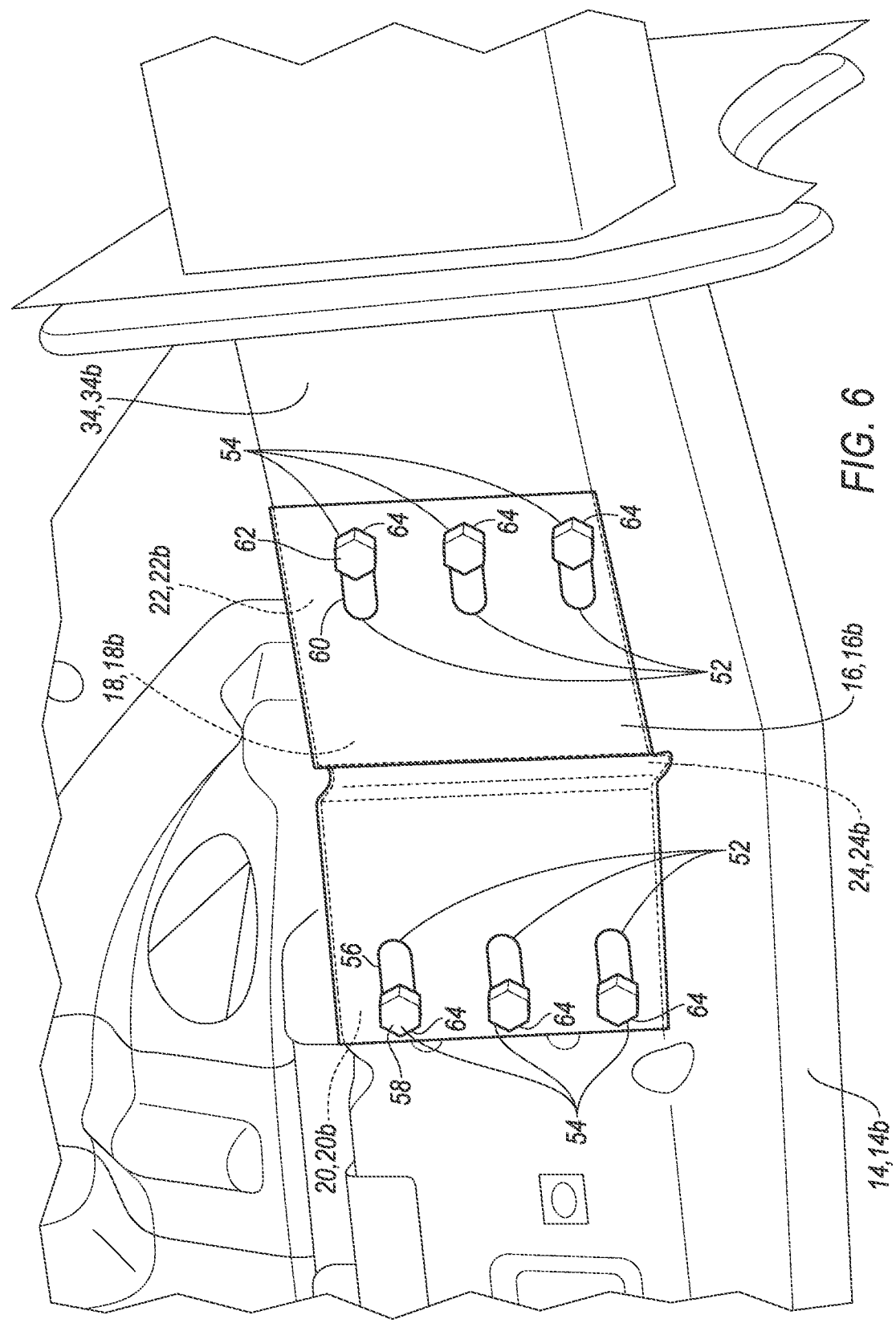
FIG. 6 is a magnified view of the second bracket when the inboard rail is in a deformed state.
Figure 7:
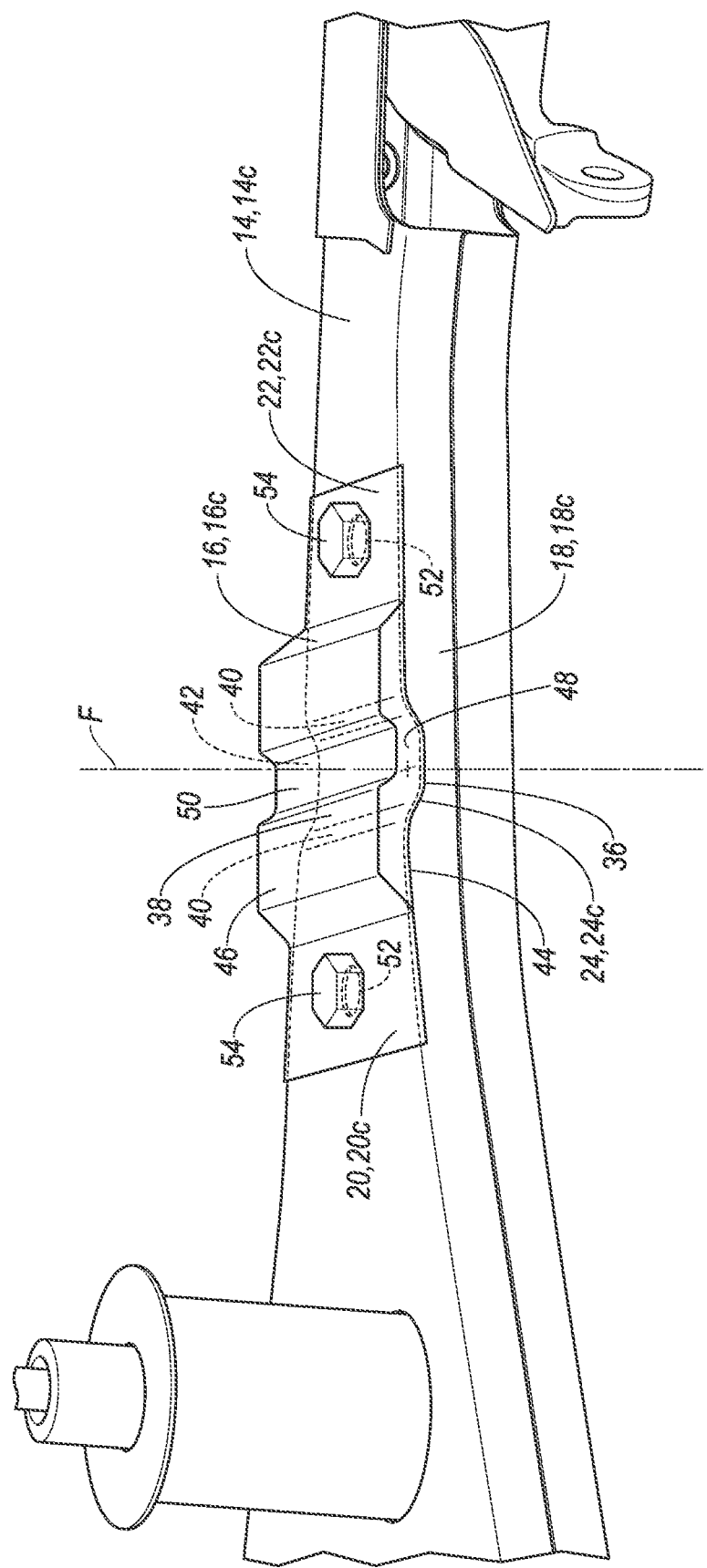
FIG. 7 is a perspective view of a rail with a divot and a third bracket.

The rail 14 includes the deformation trigger 24. The deformation trigger 24 is a portion of the rail 14 that is designed to concentrate deformation during the vehicle impact. That is, as the rail 14 absorbs impact energy, the deformation trigger 24 is designed to deform before other portions of the rail 14 deform, allowing for controlled deformation of the rail 14. The deformation trigger 24 may be a portion of the rail 14 that has a lower deformation strength than other portions of the rail 14. For example, as shown in FIGS. 7-8, the deformation trigger may be a divot 36, i.e., a depression in the straight portion 18 of the rail 14. In another example, the deformation trigger 24 may be a thinned wall, i.e., a material thickness a portion of the rail 14 may be thinner than a material thickness of another portion of the rail 14. For example, the material thickness of the straight portion 18 may be thinner than the material thickness of the rest of the rail 14. The deformation trigger 24 may be deformable from an undeformed state, as shown in FIG. 5, to a deformed state, as shown in FIG. 6.

The rail 14 may include a plurality of deformation triggers 24. For example, as shown in FIG. 2, the first rail 14a may include a first deformation trigger 24a disposed on the first outboard side 32a and a second deformation trigger 24e disposed on the first inboard side 34a. The deformation triggers 24a, 24e may be disposed on the first outboard side 32a and the first inboard side 34a to accommodate the first rail 14a deforming toward the outboard side 32a and toward the inboard side 34a. FIG. 2 illustrates deformation triggers 24 on the rails 14a, 14b, 14c, 14d, including a deformation trigger 24b on the second inboard side 34b of the second rail 14b, a deformation trigger 24f on the second outboard side 32b of the second rail 14b, a deformation trigger 24c on the third rail 14c, and a deformation trigger 24d on the fourth rail 14d. The plurality of deformation triggers 24 in the frame assembly 10 allows customization and control of deformation of the rails 14 during the vehicle impact.

The deformation trigger 24 may be disposed at a predetermined location on the rail 14. The predetermined location may be determined to control and customize deformation of the rail 14, providing predictable deformation characteristics during the vehicle impact. The predetermined location may be determined based on, e.g., empirical testing, deformation simulation models such as finite-element analysis, etc. For example, the predetermined location for the third rail 14c may be transverse to the third outboard side 32c and the third inboard side 34c.

As shown in FIGS. 7-8, the divot 36 has a divot surface 38. The divot surface 38 is an outer surface of the rail 14 formed by the divot 36. The divot surface 38 may include sloped portions 40 leading to a lowered portion 42. During the vehicle impact, the divot surface 38 may absorb energy, and the sloped portions 40 may deform about the lowered portion 42, directing absorption of the impact energy to the divot 36.

As shown in FIGS. 3-8, the straight portion 18 of the rail 14 includes the first portion 20 and the second portion 22. The deformation trigger 24 is disposed between the first 20 portion and the second portion 22. The straight portion 18, the first portion 20, and the second portion 22 may be integral with each other, i.e., formed as a unitary construction.

Figure 3:
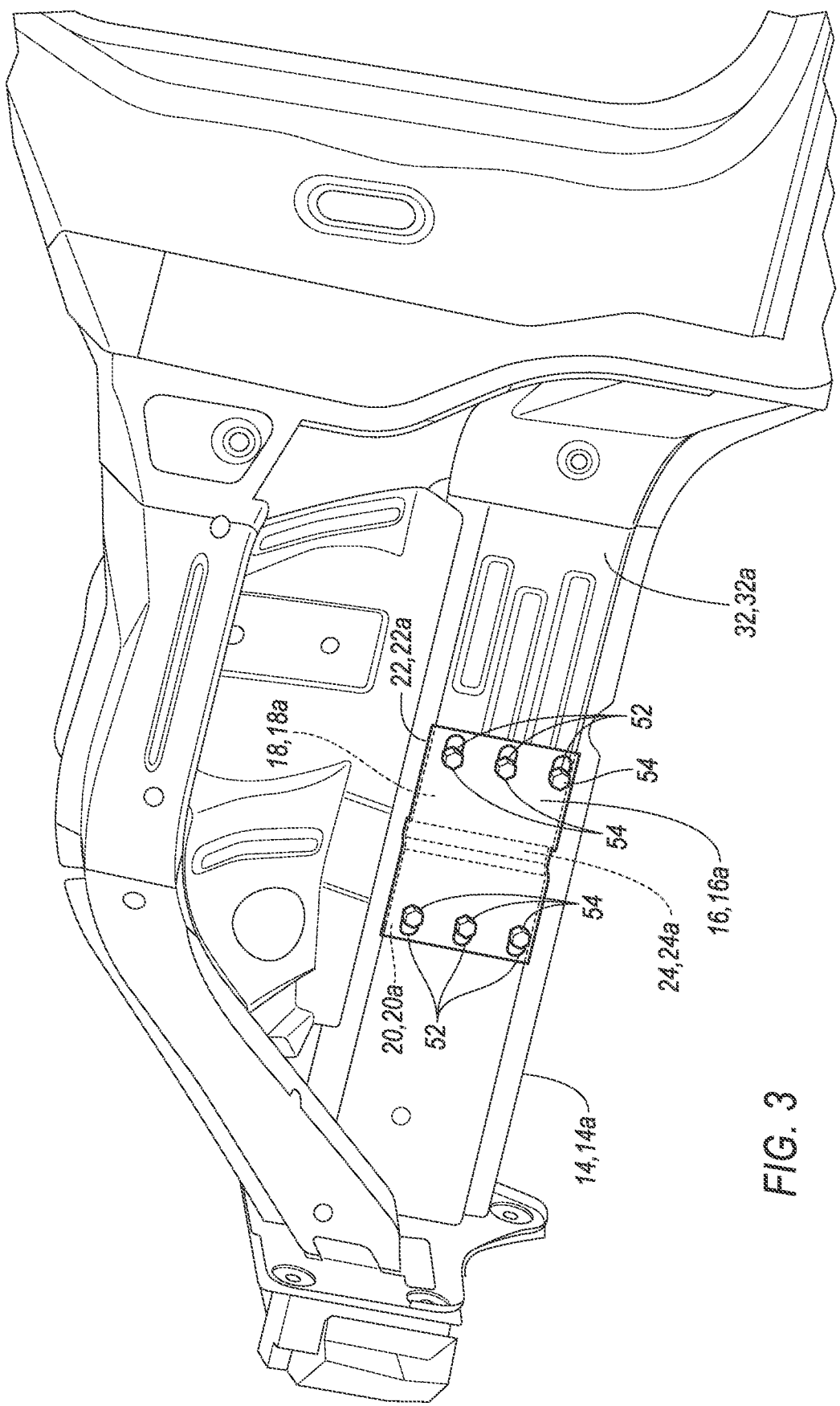
FIG. 3 is a perspective view of a portion of the frame assembly including an outboard rail with a bracket.
Figure 4:
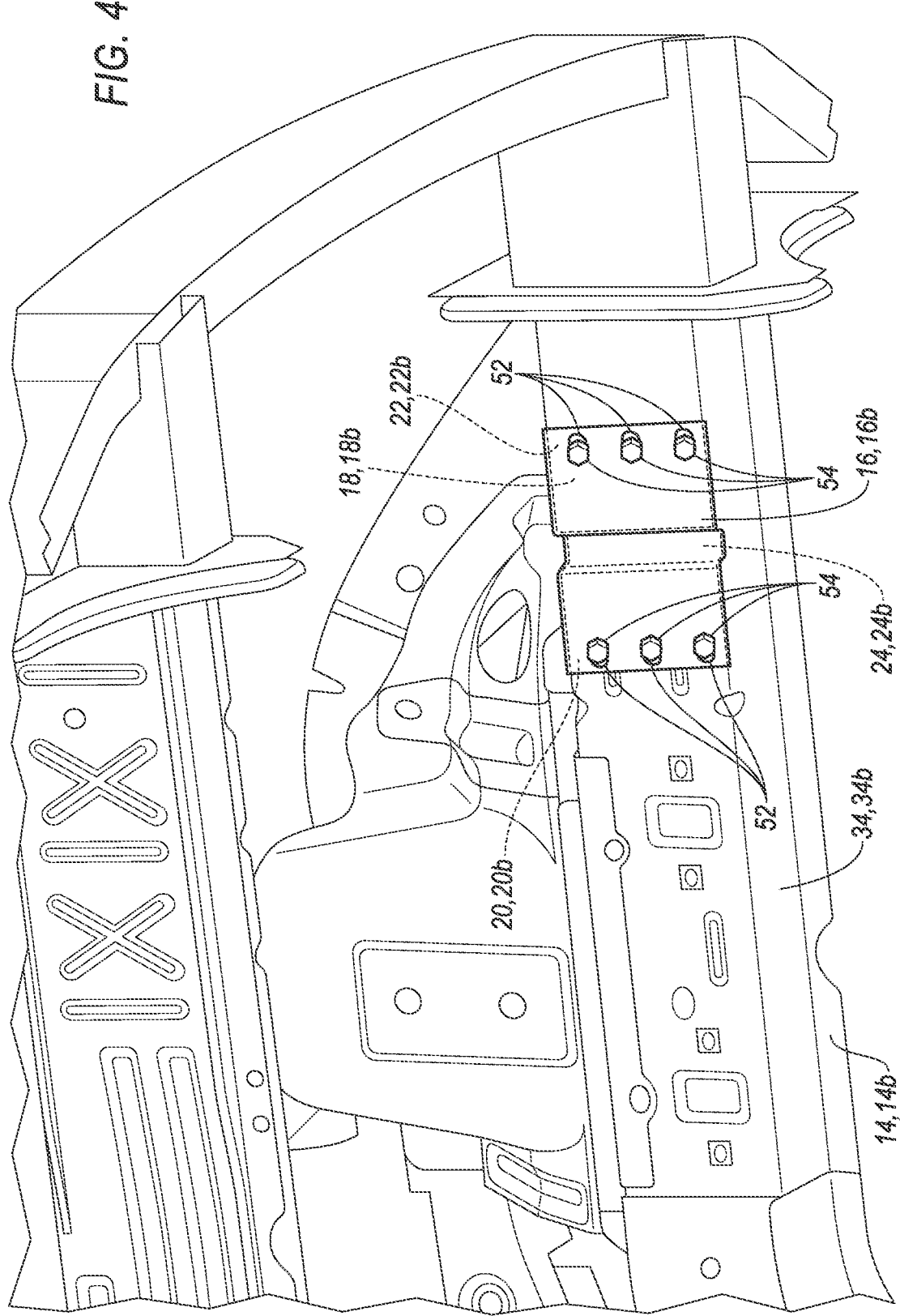
FIG. 4 is a perspective view of a portion of the frame assembly including an inboard rail with a second bracket.

The frame assembly 10 includes the bracket 16. The bracket 16 is attached to the rail 14. Different examples of the bracket 16 at different locations are shown in the Figures and the different brackets 16 are distinguished from each other with an alphabetical identifier. In particular, FIG. 3 shows a first bracket 16a on the first outboard side 32a of the first rail 14a, FIGS. 4-6 show a second bracket 16b on the first inboard side 34a of the first rail 14a, and FIGS. 7-8 shows a third bracket 16c on the third rail 14c. The first, second, and third brackets 16a, 16b, 16c may absorb energy during the vehicle impact. As shown in FIGS. 7-8, the bracket 16 may include a first side 44 facing the rail 14. The bracket 16 may include a second side 46 opposite the first side 44. The bracket 16 may be designed to absorb energy after the deformation trigger 24 has started to deform. The bracket 16 is attached to the first portion 20 of the rail 14 and to the second portion 22 of the rail 14, overlapping the deformation trigger 24. The bracket 16 absorbs energy during the vehicle impact, increasing the amount of energy absorbed and allowing for larger components to be installed onto the frame assembly.

The bracket 16 may be attached to the rail 14 on opposing sides of the deformation trigger 24. The "opposing sides" of the deformation trigger 24 are portions of the rail 14 disposed such that the deformation trigger 24 is between the portions. For example, the first portion 20 and the second portion 22 of the rail 14 are disposed on opposing sides of the deformation trigger because the deformation trigger 24 is between the first portion 20 and the second portion 22. When the bracket 16 is attached to the rail 14 on opposing sides of the deformation trigger 24, the bracket 16 extends across the deformation trigger 24. By attaching the bracket 16 to opposing sides of the deformation trigger 24, the bracket 16 is disposed over the deformation trigger 24 and may absorb energy during the vehicle impact at the position of the deformation trigger 24 when the deformation trigger 24 deforms.

The bracket 16 may include a protrusion 48, as shown in the third bracket 16c in FIGS. 7-8. The protrusion 48 may extend into the divot 36. The protrusion 48 may extend from the first side 44 of the bracket 16. The protrusion 48 may absorb energy from the rail 14 when the divot surface 38 contacts the protrusion 48. The protrusion 48 and the divot 36 may have mating shapes, i.e., the surface of the protrusion 48 may be shaped to substantially match the divot surface 38. When the protrusion 48 and the divot 36 having mating shapes, the protrusion 48 may begin to absorb energy from the divot surface 38 as the divot surface 38 deforms during the vehicle impact.

The bracket 16 may include a depression 50, as shown in FIGS. 7-8. The depression 50 may be disposed on the second side 46 of the bracket 16. During the vehicle impact, the depression 50 may deform before other portions of the bracket 16, focusing the deformation toward the depression 50. The depression 50 may be aligned with the divot 36. That is, the depression 50 and the divot 36 may be disposed along a vertical axis F transverse to, e.g., perpendicular to, a direction of deformation of the rail 14. As an example, the depression 50 and the divot 36 may overlap or be centrally aligned with each other along a longitudinal axis of the vehicle 12. When the depression 50 is aligned with the divot 36, during the vehicle impact, the depression 50 may deform at substantially the predetermined location defined by the divot 36. Thus, the rail 14 deforms at substantially the same location with the bracket 16 as without the bracket 16, preserving the predetermined location of deformation.

As shown in FIGS. 7 and 8, the depression 50 may be aligned with the protrusion 48. That is, the depression 50 and the protrusion 48 may be disposed along a vertical axis F transverse to, e.g., perpendicular to, a direction of deformation of the rail 14. As an example, the depression 50 and the protrusion 48 may overlap or be centrally aligned with each other along a longitudinal axis of the vehicle 12.

The bracket 16 may be designed to deform when the deformation trigger 24 is in the deformed state, as shown in FIG. 6. During the vehicle impact, the deformation trigger 24 absorbs energy and deforms to the deformed state before the rest of the rail 14, focusing deformation to the predetermined location on the rail 14. When the deformation trigger 24 is in the deformed state, the bracket 16 begins to absorb energy, reducing further deformation of the straight portion 18 at the deformation trigger 24. Because the bracket 16 deforms after the deformation trigger 24 is in the deformed state, additional impact energy may be absorbed at the location of the deformation trigger 24 while reducing deformation of the deformation trigger 24 itself, increasing the amount of energy absorbed at the location of the deformation trigger 24. Thus, larger components may be installed onto the frame assembly, e.g., an electric motor and battery for an electric vehicle 12.

The bracket may include a slot 52 and a fastener 54. As shown in FIGS. 3-6, the bracket 16 includes a plurality of slots 52, e.g., six slots 52. Each slot 52 may receive a respective fastener 54. A first slot 56 may be disposed at the first portion 20 of the rail 14 and may receive a first fastener 58. A second slot 60 may be disposed at the second portion 22 of the rail and may receive a second fastener 62. Each fastener 54 may connect the bracket 16 to the rail 14 in their respective slots 52. The fastener 54 may be, e.g., a bolt, a dowel, a screw, etc. By disposing the first fastener 58 opposing the second fastener 62 across the deformation trigger 24, the first and second fasteners 58, 62 (and any additional fasteners 54) may secure the bracket 16 across the deformation trigger 24.

Each slot 52 may have a respective distal end 64, as shown in FIGS. 5-6. The slot 52 terminates at the distal end 64, i.e., is smaller than the fastener 54 extending through the slot 52. Each fastener 54 may be movable in the respective slot 52 to the distal end 64. During the vehicle impact, when the deformation trigger 24 is in the deformed state, each fastener 54 may move toward the distal end 64 of the respective slot 52 and then engage the distal end 64 of the slot 52. That is, the rail 14 begins to deform before the bracket 16 as the fasteners 54 move toward their respective distal ends 64. When the fasteners 54 engage the distal ends 64 of the slots 52, the bracket 16 may begin to absorb impact energy and deform, reducing further deformation for the rail 14 as the bracket 16 deforms. Thus, the fasteners 54 and the slots 52 allow the bracket 16 to absorb energy at the location of the deformation trigger 24 while reducing the energy absorbed by the rail 14 at the deformation trigger 24.

The disclosure has been described in an illustrative manner, and it is to be understood that the terminology which has been used is intended to be in the nature of words of description rather than of limitation. The numerical adjectives used herein, e.g., "first," "second," "third," "fourth," are used merely as identifiers, and do not indicate order or importance of the modified nouns. Many modifications and variations of the present disclosure are possible in light of the above teachings, and the disclosure may be practiced otherwise than as specifically described.

What is claimed is:

1. A frame assembly, comprising:
a rail including a straight portion, the straight portion including a first portion, a second portion, and a deformation trigger between the first and second portions, the deformation trigger being a divot; and
a bracket attached to the first portion and the second portion, the bracket including a protrusion that extends into the divot.

2. The frame assembly of claim 1, wherein the protrusion and the divot have mating shapes.

3. The frame assembly of claim 2, wherein the bracket includes a first side facing the rail and a second side opposite the first side, the protrusion extends from the first side, and the bracket includes a depression on the second side.

4. The frame assembly of claim 1, wherein the bracket includes a depression aligned with the divot.

5. The frame assembly of claim 1, wherein the deformation trigger is deformable from an undeformed state to a deformed state and the bracket is designed to deform when the deformation trigger is in the deformed state.

6. The frame assembly of claim 1, wherein the bracket includes a slot disposed at the first portion and a fastener connecting the bracket to the rail in the slot.

7. The frame assembly of claim 6, wherein the slot has a distal end and the deformation trigger is deformable to a deformed state in which the fastener engages the distal end of the slot.

8. The frame assembly of claim 6, wherein the bracket includes a second slot at the second portion and a second fastener connecting the bracket to the rail in the second slot.

9. The frame assembly of claim 1, wherein the bracket is fixed to the rail on opposing sides of the deformation trigger.

10. A frame assembly, comprising:
a rail including a predetermined deformation trigger, the deformation trigger being a divot; and
a bracket including a protrusion, a fastener, and a slot, the protrusion extending into the divot, the fastener movable in the slot and connecting the bracket to the rail;
wherein the bracket is attached to the rail on opposing sides of the deformation trigger.

11. The frame assembly of claim 10, wherein the slot has a distal end and the deformation trigger is deformable to a deformed state in which the fastener engages the distal end of the slot.

12. The frame assembly of claim 10, wherein the bracket includes a second slot disposed on an opposing side of the deformation trigger from the slot and a second fastener connecting the bracket to the rail in the second slot.

13. A frame assembly, comprising:
- a rail including a straight portion and means for deforming the rail at a predetermined location on the straight portion, the means including a divot; and
- a bracket attached to the straight portion, the bracket including a protrusion that extends into the divot.

14. The frame assembly of claim 13, further comprising means for deforming the bracket after the rail deforming means deforms.

\* \* \* \* \*